United States Patent [19]

Pressaco

[11] 4,448,457
[45] May 15, 1984

[54] BRAKING PRESSURE CORRECTOR

[75] Inventor: Pierre Pressaco, La Courneuve, France

[73] Assignee: Societe Anonyme DBA, Paris, France

[21] Appl. No.: 317,088

[22] Filed: Nov. 2, 1981

[30] Foreign Application Priority Data

Nov. 28, 1980 [FR] France ................. 80 25291
Jun. 11, 1981 [FR] France ................. 81 11497

[51] Int. Cl.³ .............................................. B60T 8/18
[52] U.S. Cl. ..................................... 303/22 R; 303/56
[58] Field of Search ............... 188/195; 303/22 R, 23, 303/56

[56] References Cited

U.S. PATENT DOCUMENTS

| 3,442,557 | 5/1969 | Oberthur | 303/22 R |
| 3,563,612 | 2/1971 | Okamoto | 303/22 R |
| 3,695,735 | 10/1972 | Guettier | 303/22 R |
| 4,101,176 | 7/1978 | Carré et al. | 303/22 R |

FOREIGN PATENT DOCUMENTS

| 2112043 | 6/1972 | France. |
| 2322034 | 3/1977 | France. |
| 1239289 | 7/1971 | United Kingdom. |
| 1385180 | 2/1975 | United Kingdom. |

Primary Examiner—Duane A. Reger
Attorney, Agent, or Firm—Larry J. Palguta; Paul David Schoenle; Ken C. Decker

[57] ABSTRACT

The braking pressure corrector is controlled by the load of the vehicle by means of a controlling unit. This controlling unit (20) comprises a push rod (22), a preloading spring (26) exerting a thrust of fixed magnitude on the push rod (22), and a controlling spring (42) exerting on the push rod, through a reversing device (36), a traction of variable magnitude as an inverse function of the load of the vehicle. According to the invention, the reversing device (36) is mounted to pivot with respect to the casing (12,24) of the corrector by means of an articulation (38) of the swivel joint type.

20 Claims, 4 Drawing Figures

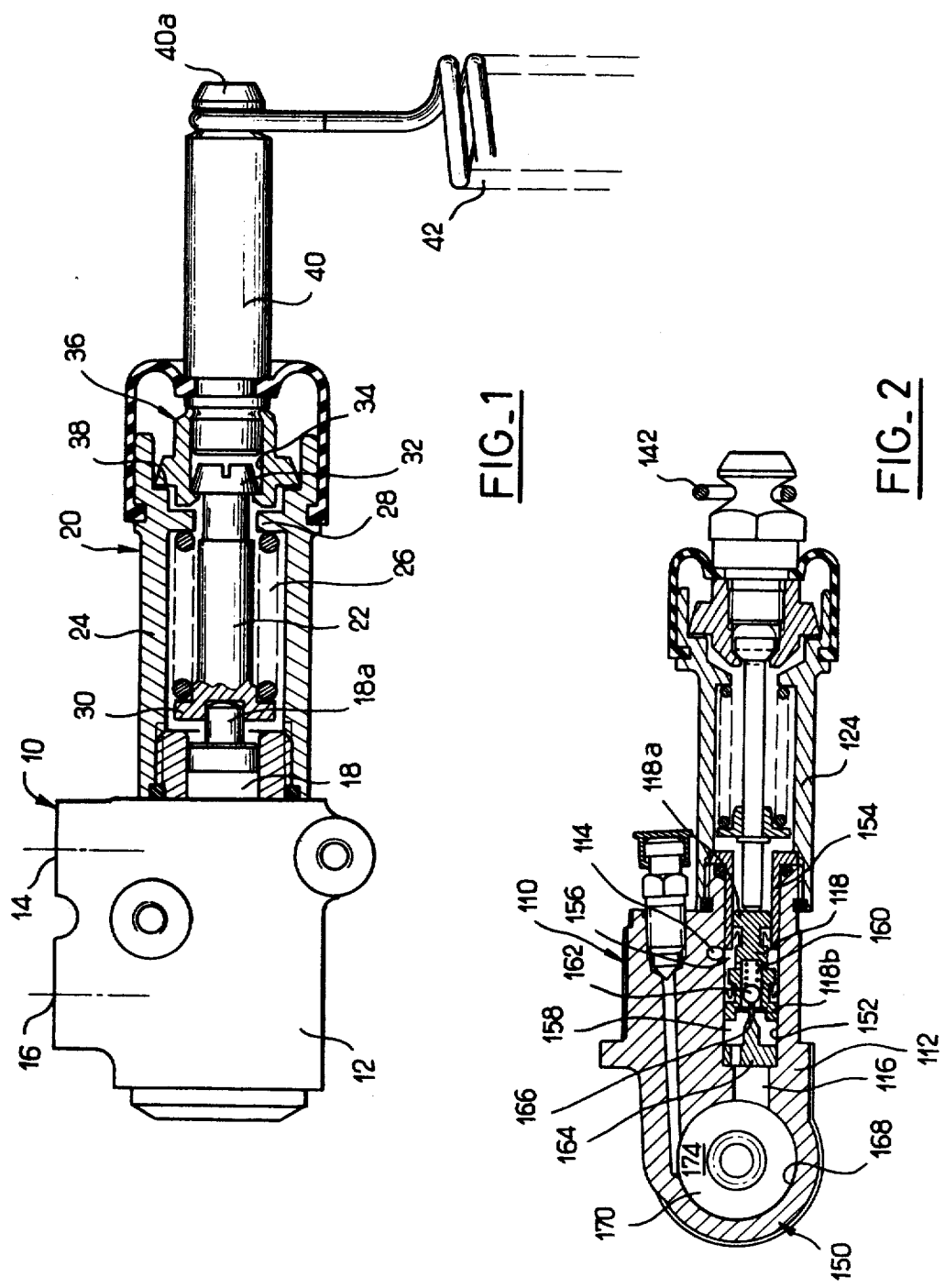

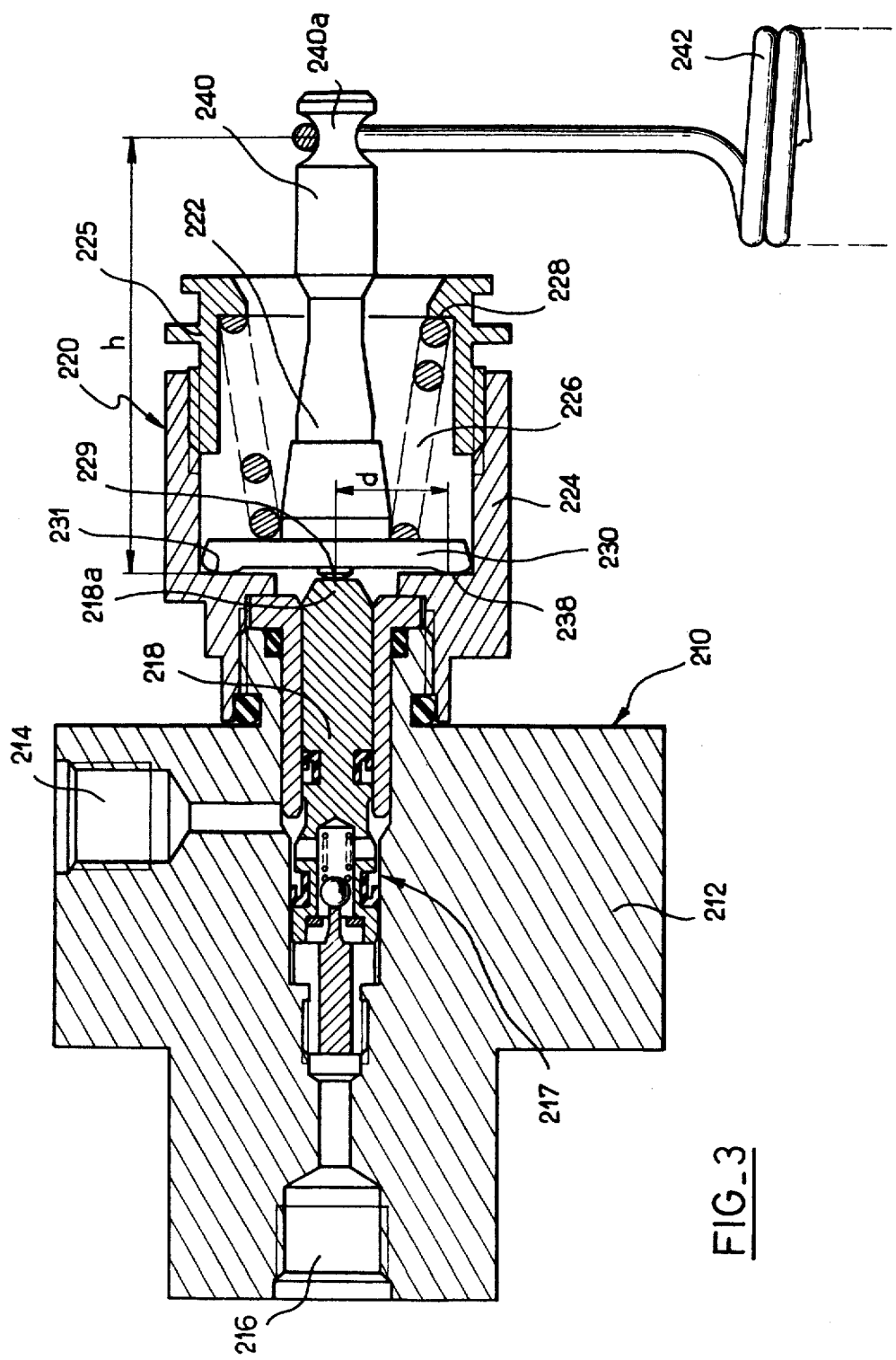
FIG_3

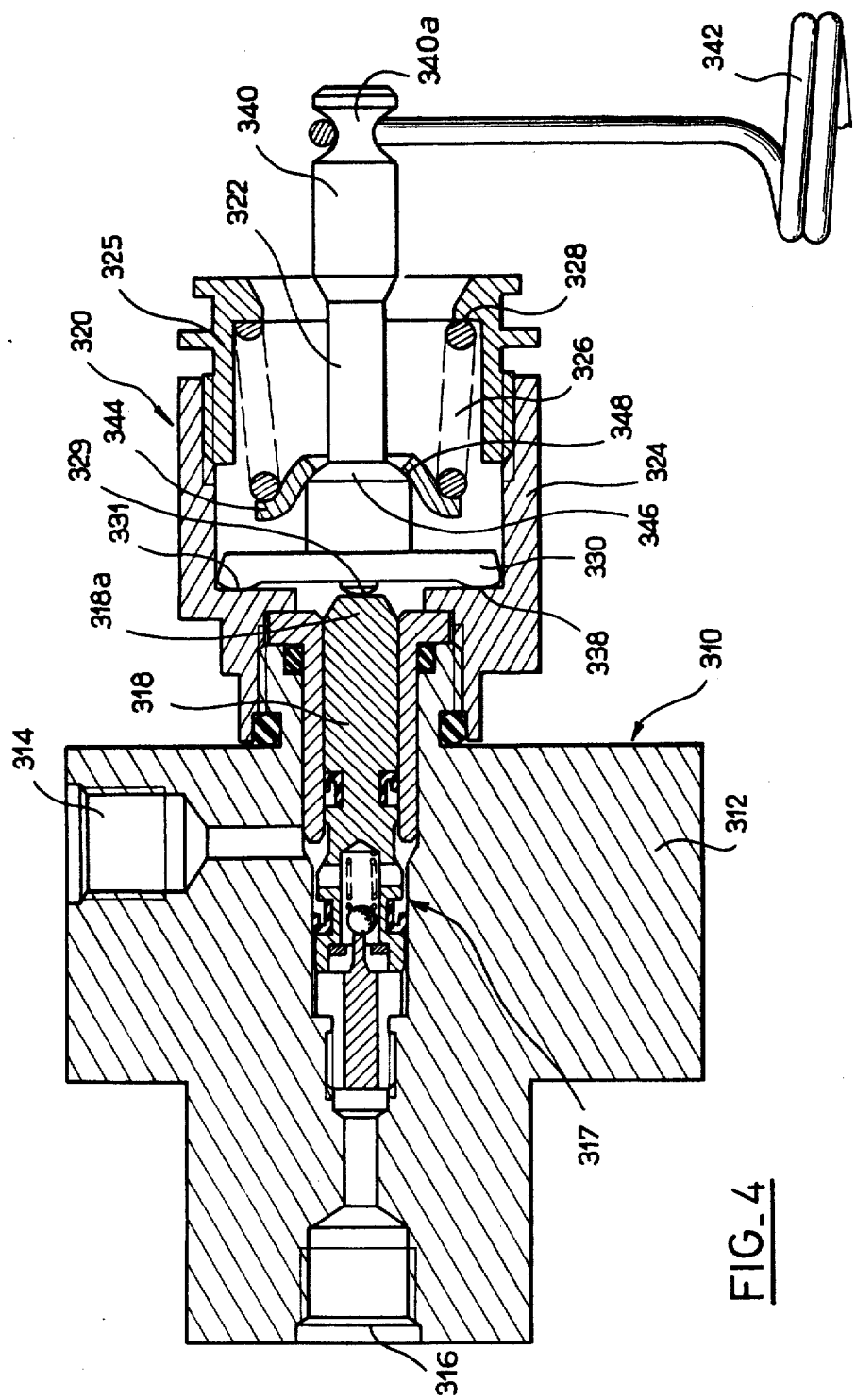

BRAKING PRESSURE CORRECTOR

The invention concerns a braking corrector controlled by the load of a vehicle.

French Pat. No. 1,282,714 discloses a braking pressure corrector which is controlled by the load of the vehicle on which this corrector is mounted, by means of a controlling unit comprising a push rod, a preloading spring exerting a thrust of fixed magnitude on the push rod and a controlling spring exerting a traction of variable magnitude on the push rod as an inverse function of the load of the vehicle.

In the case in this document, the corrector ensures a limitation of the braking pressure but it will be understood that the teachings of this patent are also applicable to braking compensators which ensure a limitation of an increase in the braking pressure.

This type of controlling unit has the disadvantage of requiring the casing of the corrector to be installed so as to be substantially in the direction in which the spring movements of the vehicle suspension occur, and the possibility of such installation does not necessarily exist in all vehicles.

Naturally, as suggested in the same document, it is possible to use a reversing lever arrangement between the controlling spring and the push rod to allow the corrector casing to be installed so as to be in a different orientation from that of the spring movements of the suspension, for instance in a substantially perpendicular orientation.

It is however established that in such an arrangement, the orientation of the controlling spring in a plane perpendicular to the axis of the casing can only be about a preferred direction. If the casing of the corrector is required to pivot with respect to its axis, for any reason, a new design of casing is therefore needed to accommodate mounting of the reversing lever arrangement.

To avoid this drawback, the invention proposes a braking pressure corrector, comprising a casing, controlled by the load of the vehicle on which said corrector is mounted by means of a controlling unit comprising a push rod, a preloading spring exerting a thrust of fixed magnitude on the push rod and a controlling spring exerting on the push rod, through a reversing device, a traction of a magnitude which can vary as an inverse function of the load of said vehicle, characterised in that said reversing device is mounted to pivot with respect to said casing by an articulation of the swivel joint type.

The invention will now be described with reference to the attached drawings in which:

FIG. 1 is a view partly in longitudinal section of a first embodiment of a braking corrector according to the invention, FIG. 2 is a view in longitudinal section of a second embodiment of a braking corrector according to the invention.

FIG. 3 is a view in longitudinal section of a third embodiment of a braking corrector according to the invention, FIG. 4 is a view in longitudinal section of a fourth embodiment of a braking corrector according to the invention. With reference to FIG. 1, a braking corrector 10 comprises a casing 12 provided with an inlet orifice 14 and an outlet orifice 16.

The inlet orifice 14 is connected to a source of pressurized fluid which consists for example of a braking master cylinder (not represented) and the outlet orifice 16 is connected to one or several brake actuators (also not represented). Lastly, the casing 12 is fixed on the chassis of the vehicle.

The inner structure of the casing 12 is not represented in detail in this figure but reference can be made to FIG. 2 and to the accompanying description to understand this inner structure.

At this stage of the description, it will simply be stated that a compensator valve is mounted in the casing 12 and that this valve is controlled by a compensator piston 18, one end 18a of which projects out from the casing 12.

On the casing 12, a controlling unit 20 is fixed, for applying a force to piston 18 which can vary as a function of the load of the vehicle.

As represented, the controlling unit 20 comprises a push rod 22 housed in a tubular housing 24 which is itself fixed on the casing 12, for example by screw engagement. A preloading spring 26 bears on an inwardly directed shoulder 28 of the housing 24 and on an external flange 30 of the push rod 22 to urge the latter and the piston 18 into the casing 12. At its end remote from the piston 18, the push rod 22 has an enlarged head 32 received in a cavity 34 of a reversing device 36, which itself bears on a place bearing surface constituted by an annular seat 38 defined at the end of the tubular housing 24.

The reversing device 36 comprises an axial extension 40 whose free end 40a has hooked onto it a controlling spring 42 which extends substantially perpendicularly to the extension 40.

At its other end, the spring 42 is connected to a non-suspended part of the vehicle, in a way which has not been represented.

The controlling unit 20 therefore exerts on the piston 18 a control force having as components a preloading thrust of fixed magnitude exerted on the push rod 22 by the preloading spring 26 and a controlling traction with a magnitude which can vary as an inverse function of the load of the vehicle exerted by the spring 42 through the reversing device 36.

It will be noted that in this way, the reversing device 36 is mounted to pivot with respect to the casing by an articulation of the swivel joint type, so that there is no preferred orientation for the spring 42 in a plane substantially perpendicular to the axis of the reversing device, which would not be the case if the transmission of the force of the spring 42 to the push rod 22 were ensured by a conventional lever system. This allows considerable scope both as regards installation of the casing 12 on the vehicle chassis and as regards the point for hooking the other end of the spring 42 onto a non-suspended part of the vehicle. In the present instance, the type of swivel joint articulation selected can be defined as a swivel joint with a plane bearing surface.

In addition, the initial setting of the preloading spring 26 can be ensured independently by acting on the screw engagement of the tubular housing 24 with the casing 12. Similarly, it is understood that the mounting of the controlling spring 42 can allow independent adjustment of this spring.

In the embodiment illustrated in FIG. 2, the corrector 10 is directly associated with a wheel cylinder 150. All the elements of this corrector which are identical to those of the first embodiment are designated by the same reference numbers increased by the value 100.

In this figure, the inner structure of the casing 12 has been illustrated in detail. In the latter, a bore 152 is provided into which the inlet orifice 114 and the outlet orifice 116 open. Between the inlet orifice 114 and the open end of the bore 152 a sleeve 154 is mounted, the latter being held in position by the tubular housing 124. The piston 118 is stepped and comprises a part 118a of small diameter sliding in the sleeve 154 and a part 118b of large diameter sliding in the bore 152 between the inlet orifice 114 and the outlet orifice 116.

The piston 118 and the bore 152 together define an inlet chamber 156 near the inlet orifice 114 and an outlet chamber 158 near the outlet orifice 116. A passage 160, provided in the piston 118, connects the two chambers 156 and 158 and a ball valve 162 is mounted in the passage 160 to control the flow of brake fluid in this passage. A stop 164, mounted at the bottom of the bore 152, has a finger 166 which projects in the direction of the ball of the valve 162 to cause the latter to open when the piston is displaced to approach this stop.

In this embodiment, the corrector 110 is directly associated with a wheel cylinger 150 in the following way: the casing 112 includes a second bore 168, substantially perpendicular to the bore 152, at the two ends of which two actuator pistons 170 and 172 slide, only the first being represented in this figure. Between the two pistons, a working chamber 174 is defined which communicates directly with the outlet orifice 116. It will be understood that this embodiment thus provides a particularly compact "corrector + wheel cylinder" unit.

It will be noted that, in this instance, the casing of the corrector is fixed to a non-suspended part of the vehicle and that the free end of the controlling spring 142 is connected to the vehicle chassis. This type of installation can naturally also be adopted for the first embodiment.

For the description of the corrector shown in FIGS. 3 and 4, the elements identical to those of the correctors FIGS. 1 and 2 bear the same reference numeral, increased respectively by the values 200 and 300.

Thus, in FIG. 3, the corrector (210) comprises a housing (212) fixed on the chassis of the vehicle and provided with an inlet orifice (214) and an outlet orifice (216), the inlet orifice being connected to the master-cylinder (not represented) of the vehicle and the outlet orifice being connected to the rear brake motors (also not represented). In the housing (212), a corrector valve (217) is fitted, which is controlled by a corrector piston (218), one end of which (218a) projects out of the housing (212).

The corrector valve (217) is not described in detail since it is identical to that of FIG. 2.

A controlling unit (220) is fixed on the housing (212), for applying a force to the piston (218) which can vary as a function of the load of the vehicle.

As represented, the controlling unit (220) comprises a push rod (222) housed in a tubular housing (224) which is itself fixed on the casing (212), for example by screwing. A preloading spring (226) bears on an inwardly directed shoulder (228) of the housing (224) and on an external flange (230) of the push rod (222) to urge the latter and the piston (218) into the casing (212).

In this embodiment, the push rod (222) itself constitutes a reversing device in the following way: the flange (230) bears on a plane bearing surface constituted by an annular seating (238) defined in the tubular housing (224) and the push rod (222) includes an axial extension (240) whose free end (240a) has a controlling spring (242) hooked onto it which extends substantially perpendicularly to the push rod (222). At its other end, the spring (242) is connected to a non-suspended part of the vehicle, in a way which is not represented.

The controlling unit (220) therefore exerts a control force on the piston (218) obtained by the combination of an axial preloading thrust of fixed magnitude exerted on the push rod (222) by the preloading spring (226) and an axial controlling traction with a magnitude which is variable as an inverse function of the load of the vehicle, this axial controlling traction resulting, via turning of the push rod (222) on the bearing surface (238), from the force exerted by the spring (242) on the free end (240a) of the push rod (222).

It will be noted that the push rod (222) is in contact with the piston (218) via a rounded projection (229) so that the force extended by the push rod (222) on the piston (218) remains constantly parallel to the axis of the latter.

Lastly, the face (231) by which the flange (230) bears on the annular seating (238) is so profiled that whatever the angle of rotation of the push rod, the ratio of the distances (h) and (d) remains constant, the distance (h) being the distance axially separating the annular seating (238) from the point at which the controlling spring (242) is hooked on the end (240a) of the push rod, and the distance (d) being the radial distance separating the point of contact between the push rod (229) and the piston (218) from the point of contact between the push rod (231) and its annular seating (238).

It will also be noted that the inwardly directed shoulder (228) on which the preloading spring (226) bears is defined on a ring (225) fitted to be axially adjustable on the tubular housing (224), for example by screwing. In this way, the initial setting of the preloading spring (226) can be easily varied.

This corrector has the following advantages with respect to the previous embodiments:
reduction in the axial size of the corrector,
reduction in the number of components,
simplification of the assembly, without altering the advantages already obtained by the previous correctors.

In FIG. 4, the corrector (310) includes the following modification: the preloading spring (326) bears on the push rod (322) via in a cup (344), the push rod (322) and the cup (344) including two complementary spherical bearing surfaces (346) and (348).

The advantage of such an arrangement is that it avoids distortion of the preloading spring (326) when the push rod (322) turns, particularly in view of the fact that this turning can be effected in any direction.

In the case of the corrector (210) of FIG. 3, the preloading force exerted by the spring (226) on the push rod (222) when the latter turns can undergo variations as a function of the direction of turning because the turns of this spring undergo different deformations according to this direction of turning.

Conversely, in the corrector of FIG. 4, the preloading spring (326) undergoes a substantially axial compression whatever the direction of turning of the push rod (322), because the cup (344) remains parallel to itself, by turning on the spherical bearing surface (348) of the push rod (322). The previously cited disadvantage is thus avoided.

What is claimed is:

1. A vehicle load sensitive braking pressure corrector, comprising a casing, sliding correcting valve means arranged within said casing, a push rod engaging said valve means in the prolongation thereof to bias said valve means in one direction, a preloading spring coupled to said push rod so as to exert on said valve means a biasing force of fixed magnitude and bias the valve means in said one direction, and a control vehicle load-sensing spring coupled to said push rod via a reversing coupling device so as to exert on said valve means a force of a magnitude varying as an inverse function of the vehicle load, characterized in that said reversing coupling device is hingedly mounted for pivotable movement relative to said casing via a swivel joint and has one end cooperating with said push rod and means adjacent its other end for connection to said load-sensing spring which extends angularly with respect to said valve means.

2. The braking pressure corrector according to the claim 1, characterized in that said swivel joint is of the type having a plane bearing surface, said push rod comprising a head received in a cavity of said reversing coupling device, said casing having an annular bearing coaxial to said push rod and constituting said plane bearing surface upon which said reversing coupling device bears.

3. The braking pressure corrector according to claim 1, characterized in that said reversing coupling device includes an extension coaxial to said push rod, at the end of which said load-sensing spring is connected.

4. The braking pressure corrector according to claim 2, characterized in that it includes a tubular housing fixed at one end to said casing and in which said push rod and said preloading spring are mounted, said reversing coupling device being mounted at the other end of said tubular housing, and said annular bearing defined at the other end of said housing.

5. The braking pressure corrector according to claim 1, characterized in that said push rod and reversing coupling device comprise a single element.

6. The braking pressure corrector according to claim 5, characterized in that said swivel joint is of the type having a plane bearing surface, said push rod including a radial flange and said casing including an annular bearing surface coaxial with said push rod and constituting said plane bearing surface upon which said radial flange of said push rod bears.

7. The braking pressure corrector according to claim 6, characterized in that said push rod includes an axial extension at the end of which said load-sensing spring is connected.

8. The braking pressure corrector according to claim 7, characterized in that said push rod includes a rounded axial projection provided to cooperate with a corrector piston slidably mounted in said casing and coaxial with said push rod and that the face of said radial flange which bears on said annular bearing surface is profiled to keep the ratio (H/D) constant, (H) being the axial distance separating the point at which the load-sensing spring is connected from the annular bearing surface and (D) being the radial distance separating the point of contact between the axial projection and piston from the point of contact between the flange and annular bearing surface, during pivoting of said push rod with respect to said annular bearing surface.

9. The braking pressure corrector according to any one of claims 6-8, characterized in that said preloading spring bears on said radial flange of the push rod and on an inwardly directed shoulder of said casing, said inwardly directed shoulder being defined on a ring fitted to be axially adjustable in said casing.

10. The braking pressure corrector according to any one of claims 6-8, characterized in that said preloading spring bears on a cup bearing on said push rod through the cooperation of two complementary spherical bearing surfaces defined respectively on said push rod and on said cup, and on an inwardly directed shoulder of said casing, said shoulder being defined on a ring fitted to be axially adjustable in said casing.

11. The braking pressure corrector according to claim 1, characterized in that said casing is integral with a wheel cylinder casing, said pressure corrector including an outlet orifice and said wheel cylinder including an inlet orifice which are in direct communication with each other.

12. A brake correction device comprising a casing, slidable correcting valve means disposed in said casing, push rod means engaging said valve means in order to effect movement therewith, resilient preloading means coupled to said push rod means to bias said push rod into engagement with said valve means, vehicle load-sensing means coupled to said push rod means and for communicating to said valve means a force of a magnitude varying inversely as a function of vehicle load sensed, and a universal coupling device providing a universal operative coupling of the vehicle load-sensing means with the correcting valve means whereby said load-sensing means is displaceable in a plurality of directions to effect displacement of said push rod means and operatively coupled valve means.

13. The brake correction device in accordance with claim 12, wherein said resilient preloading means is disposed about said push rod means.

14. The brake correction device in accordance with claim 12, wherein said resilient preloading means is disposed internally of said casing and counterbalances the load-sensing means.

15. The brake correction device in accordance with claim 12, wherein said universal coupling device includes a flat bearing surface and said push rod means includes a head portion received in a cavity of said universal coupling device, the casing having an annular bearing coaxial with said push rod and comprising by a bearing surface engaged by said flat bearing surface.

16. The brake correction device in accordance with claim 12, wherein said push rod means and universal coupling device comprise a single element coupled with said resilient preloading means.

17. The brake correction device in accordance with claim 12, wherein said push rod means further comprises a radial flange and said casing includes an annular bearing surface coaxial with said push rod means, the radial flange of said push rod means bearing upon said annular bearing surface.

18. The brake correction device in accordance with claim 17, further comprising an inwardly directed shoulder disposed on said casing, the resilient preloading means bearing at one end on said radial flange of the push rod means at the other end on said inwardly directed shoulder.

19. The brake correction device in accordance with claim 18, further comprising an axially adjustable ring engaging said housing and providing said shoulder.

20. The brake correction device in accordance with claim 18, further comprising two complementary spherical bearing surfaces disposed respectively on said push rod means and on a cup engaging said push rod means, the resilient preloading means bearing at one end on said cup and at the other end on the inwardly directed shoulder of said casing, said inwardly directed shoulder disposed on a ring axially adjustable relative to said casing.

* * * * *